United States Patent Office 3,532,444
Patented Oct. 6, 1970

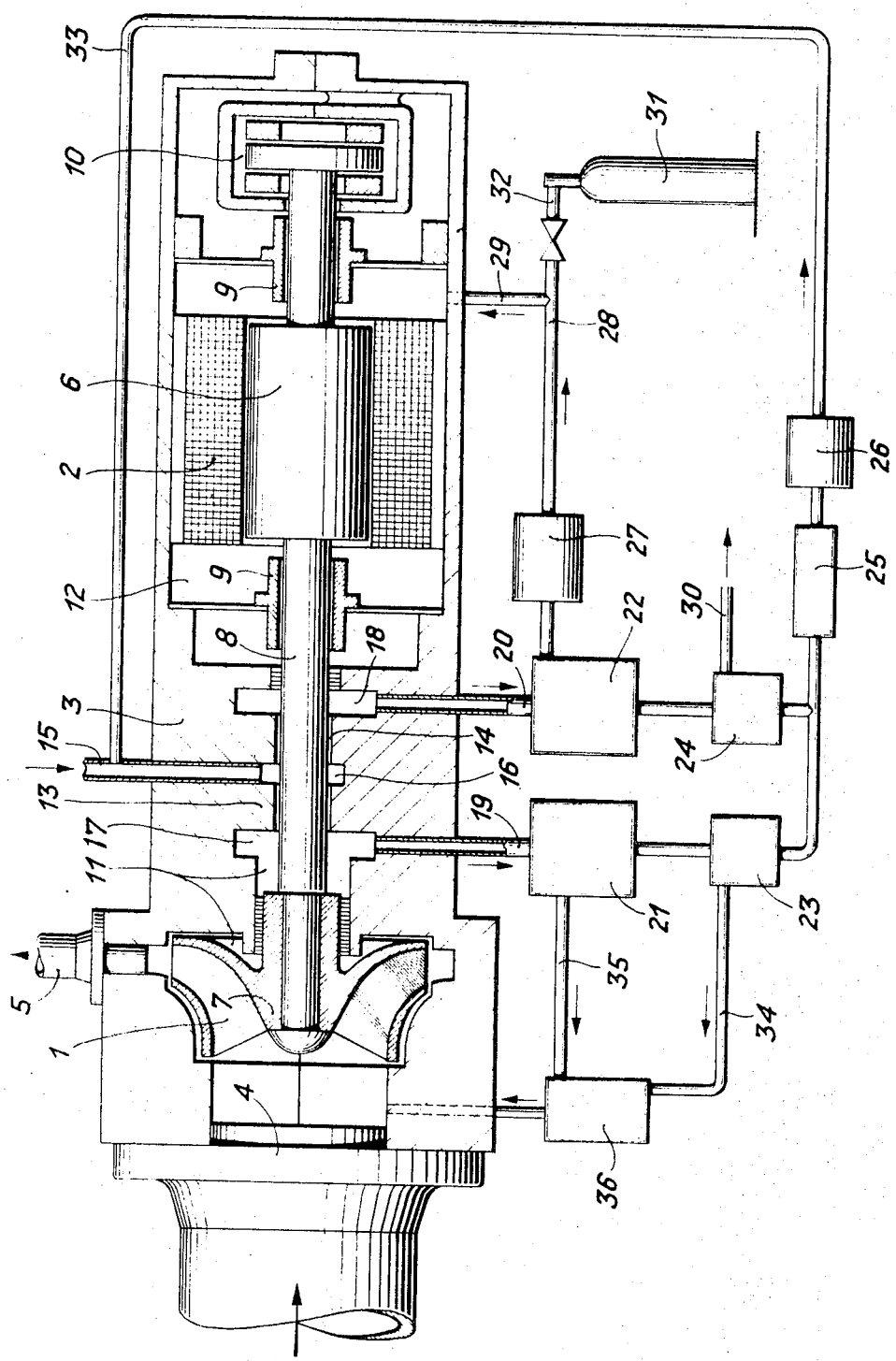

3,532,444
GAS PUMPING APPARATUS
René Strub, Winterthur, Switzerland, assignor to Sulzer Brothers Limited, Winterthur, Switzerland, a Swiss company
Filed Aug. 14, 1968, Ser. No. 752,602
Claims priority, application Switzerland, Aug. 18, 1967, 11,675/67
Int. Cl. F04d 25/06, 29/00; F16j 15/00
U.S. Cl. 417—423 4 Claims

ABSTRACT OF THE DISCLOSURE

There is disclosed gas pumping apparatus comprising a gas-tight housing, a motor and a blower in separate compartments in the housing separated by a partition through which passes a drive shaft coupling the motor to the blower, means to deliver sealant liquid to a liquid seal between the shaft and bearing, and separate means to recover sealant liquid at either side of the partition. Separate liquid-gas separators and gas extractors are also provided for each of the recovered quantities of sealant liquid.

---

The present invention pertains to apparatus for pumping gases. The term "pumping" is here used to cover the conveyance of gas with or without any large increase in pressure and includes feeding into gas mains, compressing and circulating. The invention pertains more particularly to pumping apparatus having a blower which is driven by an electric motor and is enclosed with the motor in a gas-tight housing, the blower compartment being separated from the motor compartment within the housing by a partition through which there passes a shaft by which the motor and blower are coupled together. Such apparatus may be used, for example, if the gases to be pumped must not be mixed with other gases, or if they are corrosive or dangerous to life or health. For this purpose, the pumping apparatus must be hermetically sealed so that, at least as far as the blower compartment is concerned, gases cannot enter or escape. Even inside the compartments in the housing, therefore, the gas being pumped and the gas for the motor must be kept completely separate.

In one known form of seal which may be used, in apparatus of the type to which the invention pertains, at the passage of the shaft through the partition, the two gases are separated by means of packings from which gas is removed by suction. In the central part of a packing sleeve provided for this purpose, the unlike gases leaking into the sleeve from the blower compartment and motor compartment during operation are collected in an annular groove and removed in the form of a gaseous mixture. The mixture may then be separated into its constituent gases by suitable means and the constituent gases may then be returned to the apparatus or otherwise removed. However, because the losses through such gas packings may be minimal, the mixed, leaked gas in the collecting groove and the gas between the shaft and the sleeve may linger so long that diffusion into the blower and motor compartments may occur, thus producing in each compartment an undesirable admixture of gas from the opposite compartment.

To prevent such diffusion it is proposed, in accordance with the invention, to provide in the partition separating the motor from the blower a liquid seal providing sealing action at the shaft both against the blower compartment and the motor compartment, and to provide further on each side of the partition means to recover sealant liquid leaking out of the seal.

Because sealant liquid is introduced into the seal in the partition between the blower and motor compartments, which are filled with (usually) different gases, diffusion of the gases can almost entirely be prevented. The blower compartment and motor compartment gases never come into direct contact with one another. Also, the rate of flow of the sealant liquid may be selected to be greater than the speed of diffusion at the surfaces of contact between the gases and the sealant liquid and through the liquid gaps in the liquid seal itself. Gas particles cannot, therefore, advance in a direction opposite to the direction of flow of the sealant liquid in the sealing gaps and so enter the opposite gas compartment.

The liquid coming into contact with the gases on the two sides of the partition may be completely prevented from penetrating further into the motor or blower by means of simple collecting devices. It is then necessary merely to withdraw from the housing the sealant liquid collected in each compartment and to separate it from the gases contained in it by means of separators. If necessary, the leakage sealant liquids so recovered from the blower and motor compartments may be passed through extraction means which follow the respective separators and in which residual gases are extracted therefrom. The sealant liquid may be returned to the sealing system when sufficiently freed of gases. The separated gases may be returned to the blower and to the motor compartment respectively. There is no need to effect a separation of a mixture of the two gases, since they can never come into contact with one another.

BRIEF DESCRIPTION OF THE DRAWING

The invention will now be further described in terms of a presently preferred non-limitative exemplary embodiment thereof and with reference to the accompanying drawings, in which the single figure of drawing is a diagrammatic representation of one form of gas pumping apparatus in accordance with the invention.

DESCRIPTION OF THE PREFERRED EMBODIMENT

In the drawing, a blower 1 and an electric motor 2 which drives it are disposed in a housing 3 which is gas-tight relative to the exterior. The gas to be pumped is supplied to the housing through a union 4 and leaves it at an outlet 5. The rotor 6 of the motor and the blower impeller 7 are fixed to a shaft 8 mounted in gas-lubricated bearings 9. The axial thrust of the blower is carried by another gas-lubricated bearing 10. The blower compartment 11 is separated in gas-tight fashion from the motor compartment 12 of the housing 3 by means of a partition 13 through which passes the shaft 8.

The blower 1 can pump safely a gas which must not be allowed to be contaminated even by traces of other gases or which might endanger health or life in the vicinity if it leaked. Hence gases must not enter the motor compartment 12, which is filled with lubricating gas. On the other hand, no lubricating gas must penetrate from the motor compartment into the gas to be pumped by the blower. In order to avoid these risks of contamination a liquid seal 14 is incorporated into the partition 13 and operates to seal the blower compartment 11 and the motor compartment 12 from each other. Sealant liquid is fed through a line 15 to the annular compartment 16 of the seal, at a pressure higher than that of the gases on either side of the seal. Because the clearance between the shaft and the housing 3 is small at the seals 14 on either side of the annular enlargement 16, only a small amount of liquid flows along the shaft into the compartments 11 and 12 under the pressure at line 15. Means diagrammatically indicated as sumps 17 and 18 are provided in the blower and motor compartments respectively to collect the sealant liquid escaping from the liquid seal. The liquid which is caught is carried away separately on the two sides of the partition, along ducts 19 and 20 to separators 21 and 22 respectively. Gases entrained in the liquid are separated mechanically in these separators. Any residual gases may be expelled, for example thermally, in extraction means 23 and 24 if necessary. Alternatively, residual gases can be chemically combined and the resulting compounds can be removed from the sealing liquid.

The gas separated in the separator 21 returns to the blower 1 along a line 35, whereas the gas expelled (for example thermally) in the extraction means 23 is fed along a line 34 to a fully enclosed compressor 36 for the necessary increase in pressure before it also returns to the blower 1.

The gas from the motor compartment, having been separated in the separator 22, is returned to this compartment along a line 29 by means of a fully enclosed compressor 27. If the sealing liquid has not been sufficiently degassed in the separator 22, the residual gas may be thermally or chemically expelled in the extraction means 24 and removed along a line 30.

The sealing liquid from the blower and motor compartments, now free of gas, flows to a common storage reservoir 25, from which the mixture is fed back to the liquid seal 14 by way of a pump 26 and line 33.

Any gas losses in the motor compartment 12 may be made up from a gas cylinder 31 along the lines 32, 29. Sealing liquid losses may be made up from the line 15.

The gas pressure upstream of the blower 1 and the pressure increase in the blower may be selected for every case according to the technical data. The blower may be used for example to maintain the gas circulation in closed circuits, to feed gas continuously to gas mains or to compress gases to high pressures. The apparatus described may be used to especial advantage in atomic power stations.

While the invention has been described hereinabove in terms of a presently preferred embodiment thereof, the invention itself is not limited thereto but rather comprehends all modification of and departures from that embodiment properly falling within the spirit and scope of the appended claims.

I claim:
1. Gas pumping apparatus comprising a housing, a motor within the housing, a blower within the housing, drive means coupling the blower to the motor, a partition separating the motor from the blower, said partition being traversed by said driving means, means to provide a liquid seal between said drive means and partition, separate means to recover sealant liquid on the blower and motor sides of the partition, liquid-gas separating means, and means to deliver sealant liquid collected on the motor side of the partition to said separating means.

2. Gas pumping apparatus according to claim 1 including means to return to the motor gas separated in said separating means.

3. Gas pumping apparatus according to claim 2 including means to supply make-up gas to the motor.

4. Gas pumping apparatus according to claim 1 including gas extraction means connected in the flow path of sealant liquid separated in said separating means.

References Cited
UNITED STATES PATENTS

| | | | |
|---|---|---|---|
| 2,710,205 | 6/1955 | Brkich | 308—36.3 |
| 2,820,652 | 1/1958 | Oechslin | 277—135 |
| 2,910,328 | 10/1959 | Frolich | 308—36.3 |
| 2,911,919 | 11/1959 | Tucker | 103—111 |
| 2,913,989 | 11/1959 | Boardman et al. | 103—111 |
| 3,305,518 | 10/1961 | Jassniker | 277—15 |
| 3,356,290 | 12/1967 | Lehmann | 230—132 |
| 3,420,434 | 1/1969 | Swearingen | 230—116 |

HENRY F. RADUAZO, Primary Examiner

U.S. Cl. X.R.
277—15; 415—112